United States Patent [19]
Ogawa et al.

[11] 3,869,629
[45] Mar. 4, 1975

[54] STATOR IN SMALL ELECTRIC MACHINE

[75] Inventors: Takashi Ogawa; Kiyonori Kida; Shunichi Sugiyama, all of Kawasaki, Japan

[73] Assignee: Fuji Denki Seizo Kabushiki Kaisha, Kawasaki-shi, Kanagawa-ken, Japan

[22] Filed: Sept. 26, 1973

[21] Appl. No.: 400,812

[30] Foreign Application Priority Data
Sept. 27, 1972 Japan.............................. 47-96893

[52] U.S. Cl.................... 310/216, 310/86, 310/218, 310/254
[51] Int. Cl.............................................. H02k 1/16
[58] Field of Search ....... 310/40 MM, 86, 105, 162, 310/216, 218, 254, 258, 259, DIG. 2

[56] References Cited
UNITED STATES PATENTS
3,153,161  10/1964  Gabriel.............................. 310/162
3,202,851  8/1965  Zimmerle et al..................... 310/259
3,206,629  9/1965  Jensen............................... 310/254 X

*Primary Examiner*—A. D. Pellinen
*Attorney, Agent, or Firm*—Holman & Stern

[57] ABSTRACT

A stator in a small electric machine such as a micromotor comprises: a stator core provided with tooth-like poles and fully opened winding accommodating slots; and a special sleeve provided with protruded portions and bridging portions connecting the protruded portions, the special sleeve being inserted in the stator core in such a manner that the protruded portions contact the ends of the tooth-like poles of the stator core thereby closing the winding accommodating slots. The stator thus organized facilitates the insertion of the windings into the winding accommodating slots.

3 Claims, 7 Drawing Figures

3,869,629

STATOR IN SMALL ELECTRIC MACHINE

BACKGROUND OF THE INVENTION

This invention relates to stators in small electric machines and more particularly to the construction of the stator which facilitates the insertion of windings in the stator.

The term "small electric machines" as herein used is intended to designate motors of the character described below. One typical example of such a motor is one having a housing diameter of the order of 40 mm, and a housing length of the order of 50 mm.

Since hysteresis synchronous motors are considerably affected by a spatial harmonic magnetomotive force in a revolving magnetic field, it is necessary to alleviate this affection as much as possible thereby to improve the performance of the hysteresis synchronous motors.

Heretofore, in an ordinary small a.c. machine, semi-enclosed slots have been employed as its winding accommodating slots in the stator core in order to reduce or alleviate the spatial harmonic magnetomotive force. However, because of the employment of the semi-enclosed slots, it takes a number of working steps for the insertion of the windings in the semi-enclosed slots. Accordingly, such a stator has been an obstacle to a trial of mechanically or automatically inserting windings into the stator.

Especially, in a hysteresis synchronous motor having a small number of teeth per pole, it is necessary to further alleviate the effect of the spatial harmonic magnetomotive force, thereby improving the performance thereof. For this purpose, in such a hysteresis synchronous motor, semi-enclosed slots are employed as the winding accommodating slots in its stator core, and after the windings have been inserted therein, a cylindrical sleeve is inserted in contact with the stator core thereby fully enclosing the windings in the winding accommodating slots.

In this connection, it goes without saying that the wider is the width of an opening portion of the winding accommodating slot, the easier is the insertion of the winding in the winding accommodating slot and accordingly the mechanical or automatic insertion of a winding therein. However, the effect of a spatial harmonic magnetomotive force in a rotating magnetic field increases with the width of the opening portion of the winding accommodating slot, thus lowering the performance of the hysteresis synchronous motor.

SUMMARY OF THE INVENTION

Accordingly, it is a primary object of this invention to solve all of the above-described problems accompanying a conventional stator in a small electric machine.

Another object of the invention is to provide a stator in a small electric machine in which the insertion of windings in winding accommodating slots can be readily achieved.

A further object of the invention is to provide a stator of a small electric machine in which the effect of a spatial harmonic magnetomotive force is considerably alleviated for the purpose of improving the performance of the small electric machine.

The manner in which the foregoing objects and other objects have been achieved by this invention will become more apparent from the following detailed description and the appended claims when read in conjunction with the accompanying drawings.

DETAILED DESCRIPTION OF THE INVENTION

Figure 1:
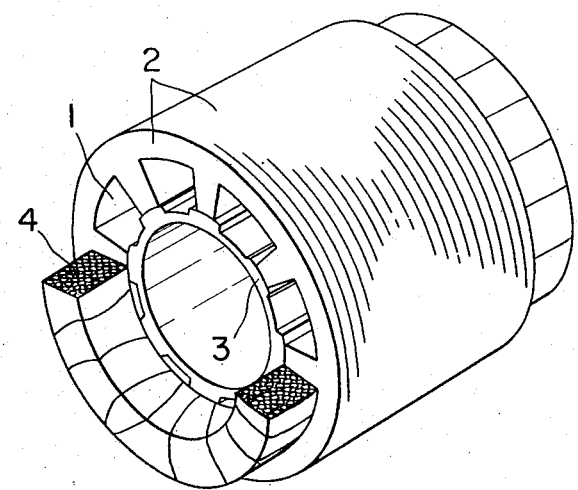
FIG. 1 is a perspective view, with parts cut away, illustrating one example of the stator of a small electric machine according to this invention.

With reference to FIG. 1, there is shown one preferred example of the stator of a small electric machine according to this invention, which comprises: winding accommodating slots 1 fully opened in a stator core 2; an inner sleeve 3 having a special shape (hereinafter referred to as "a special sleeve 3") for closing the winding accommodating slots 1; and windings 4.

Figure 2:
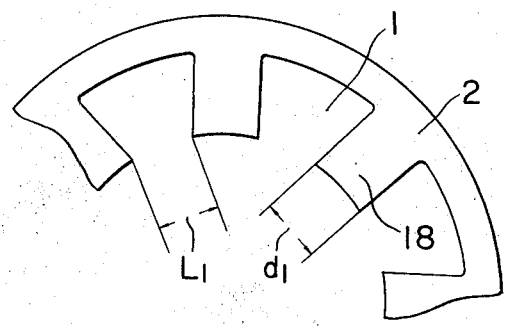
FIG. 2 is an enlarged plan view illustrating a part of the stator core shown in FIG. 1.

An enlarged diagram of the stator core as viewed in the axial direction thereof is shown in detail in FIG. 2 for the purpose of illustrating the winding accommodating slots 1. Each of the winding accommodating slots 1 is formed by adjacent tooth-like poles 18 of the stator core 2. The thickness of the tooth-like portions 18 and the distance between the ends of the adjacent tooth-like poles 18 are designated by $d_1$ and $L_1$, respectively.

Figure 3:
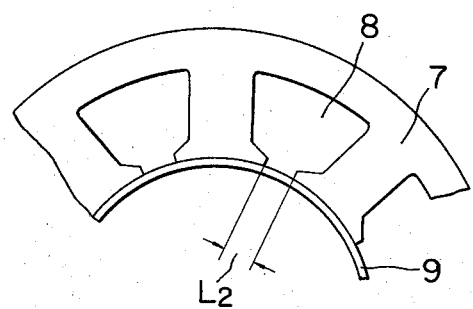
FIG. 3 is an enlarged plan view illustrating a part of the conventional stator core.

The winding accommodating slot 1 in FIG. 2 will be compared with a conventional one 8 in FIG. 3 which is a semi-enclosed slot.

As is shown in FIG. 3, each of the conventional winding accommodating slots 8 is also formed by two adjacent tooth-like poles of the stator core 7 and the distance between the ends of the adjacent tooth-like portions is designated by $L_2$. The conventional winding accommodating slots 8 are merely closed by a cylindrical sleeve 9. As is apparent from a comparison of FIG. 2 with FIG. 3, the distance $L_1$ is much wider than the distance $L_2$.

Accordingly, insertion of the windings 4 in the winding accommodating slots 1 can be readily achieved and it is possible to mechanically or automatically insert the windings 4 in the winding accommodating slots 1.

Figure 4:
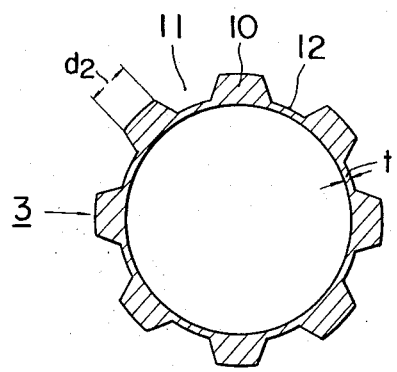
FIG. 4 is a cross-sectional view of a special sleeve according to the invention.

Shown in FIG. 4 is a cross-sectional diagram of the special sleeve 3 which comprises protruded portions 10, recessed portions 11 and bridging portions 12 having a thickness $t$. The peripheral length of the protruded portion 10 is designated by $d_2$. The special sleeve 3 is so designed that, when it is inserted in the stator core 2, the recessed portions 11 confront the winding accommodating slots 1, respectively, while the protruded portions 10 confront the tooth-like poles 18 of the stator core 2, respectively.

The shape of the recessed portion 11 and the thickness $t$ of the bridging part 12 in the special sleeve 3 greatly contribute to the reduction of the spatial high frequency magnetomotive force in a rotating magnetic field. If the thickness $t$ of the bridging portion 12 is made excessively great, it will cause too much magnetic flux to be shorted at the bridging portion 12, that is, effective magnetic flux necessary for a rotor (not shown) is disadvantageously reduced. The thinner the thickness $t$ of the bridging portion 12 is, the better the effect is.

Figure 6:
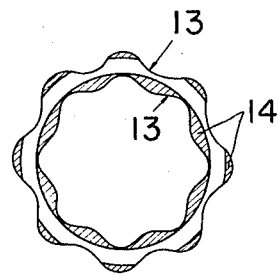
FIG. 6 is a cross-sectional view of a cylindrical sleeve which will be cut to form the special sleeve shown in FIG. 4.

In addition, the relationship between the peripheral length $d_2$ of the protruded portion 10 of the special sleeve and the width $d_1$ of the tooth-like pole 18 of the stator core 2 should be $d_2 \geq d_1$. The recessed portion 11 of the special sleeve 3 has a smoothly curved surface. An example of the favorable smoothly curved surface is shown in FIG. 6. As a result thereof, the embodiment of the present invention has smoother magnetic flux variations and fewer harmonic occurrences than in the prior art device shown in FIG. 3 in which the cylindrical sleeve 9 is inserted into the stator core 7 having the semienclosed slot 8. Furthermore, if the shape and thickness of the special sleeve 3 are properly selected, the performance of a small electric machine employing the stator according to this invention will be equal to or better than that of the conventional small electric machine.

Figure 7:
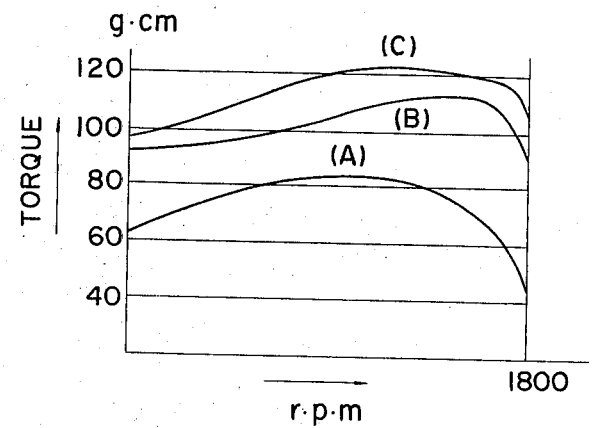
FIG. 7 is a graphical representation indicating curves of revolution per minute (r.p.m.) versus torque with respect to various small electric machine.

In FIG. 7 are shown curves A, B and C of revolution per minute (r.p.m.) versus torque with respect to four-pole hysteresis synchronous motors. Curve A is a characteristic curve in the case where a four-pole hysteresis synchronous motor is provided with a stator core having conventional semi-enclosed slots without an inner sleeve. Curve B shows another characteristic curve in the case where the four-pole hysteresis synchronous motor is provided with a stator core having the conventional semi-enclosed slots and a cylindrical sleeve. Curve C is also plotted in the case where the four-pole hysteresis synchronous motor is provided with a stator core having the fully opened slots and the special sleeve 3 in accordance with this invention.

The special sleeve 3 can be readily manufactured at a low cost by a conventional manufacturing method such as hot drawing, cold drawing and sintering methods. Furthermore, the special sleeve 3 may be fabricated as follows: that is, a cylindrical sleeve is conventionally pressed into the shape as shown by the solid lines 13 in FIG. 6 and the sleeve thus pressed is cut of the portions 14 hatched.

Figure 5:
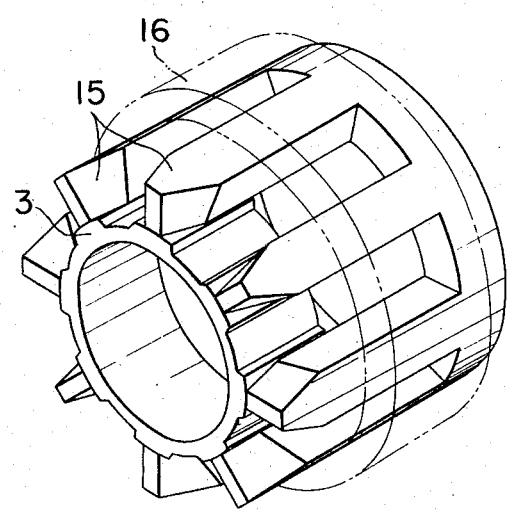
FIG. 5 is a perspective view illustrating another example of the stator according to the invention.

Another example of this invention will be described with reference to FIG. 5, in which are shown tooth-like poles 15, a winding 16 and a special sleeve 3.

Incidentally, the conventional small a.c. motor has a difficulty such as the winding should be inserted in the winding accommodating slot through the inner peripheral portion of the stator core. The second example described above is provided for the solution of this difficulty. That is, in a small a.c. motor having the stator as shown in FIG. 5, the winding can be readily inserted in the winding accommodating slot from the axial direction of the small a.c. machine.

More specifically, the shape of the stator core is such that a plurality of tooth-like poles are protruded from a ring-shaped or a plated shaped yoke. The winding formed in advance is put on the stator core from the axial direction of the stator core and the special sleeve 3 is then inserted in the central space formed by the tooth-like poles, thus forming the stator.

However, if the conventional cylindrical sleeve is employed for the formation of such a stator, it is necessary to employ the conventional winding accommodating slots, or the semi-enclosed slots, in order to obtain satisfactory performance of the small electric machine. On the other hand, if the special sleeve according to this invention is employed for the formation of the stator, the shape of the winding accommodating slots may be of a conventional fully opened slot to demonstrate the features and effects of the stator described above.

While this invention has been described in connection with the cases where it is practiced with the hysteresis synchronous motor, it is obvious that the invention can show its sufficient effects with an induction motor as well as a small a.c. motor whose rotor revolves around the stator.

What we claim is:

1. A stator in a small electric machine which comprises a substantially cylindrical stator core having a plurality of tooth-like poles which radially extend from the inner surface thereof and which define a plurality of winding accomodating slots therebetween; windings inserted in said winding accomodating slots; and a substantially cylindrical inner sleeve which includes a plurality of protruded portions each of which respectively contact a tooth-like pole of said stator core and bridging portions which join the protruded portions, the protruding portions and the bridging portions forming recessed portions in said inner sleeve, the width of each of said protruded portions being greater than the width of its corresponding tooth-like pole.

2. A stator in a small electric machine as claimed in claim 1 in which the winding accommodating slots are of a fully open type winding accommodating slots and the inner sleeve closes the winding accommodating slots.

3. A stator in a small electric machine which comprises a stator core which includes a ring-shaped yoke from which are axially extended a plurality of tooth-like poles between which are defined a plurality of winding accomodating slots; windings inserted in said winding accomodating slots along the axial direction of said stator; and a substantially cylindrical inner sleeve which includes a plurality of protruded portions each of which respectively contact a tooth-like pole of said stator core along the inside periphery thereof and bridging portions which join the protruded portions, the protruding portions and the bridging portions forming recessed portions in said inner sleeve.

* * * * *